July 1, 1958  E. M. TUCKER  2,841,022
TWISTED CHAIN DRIVE
Filed Feb. 10, 1955  2 Sheets-Sheet 1
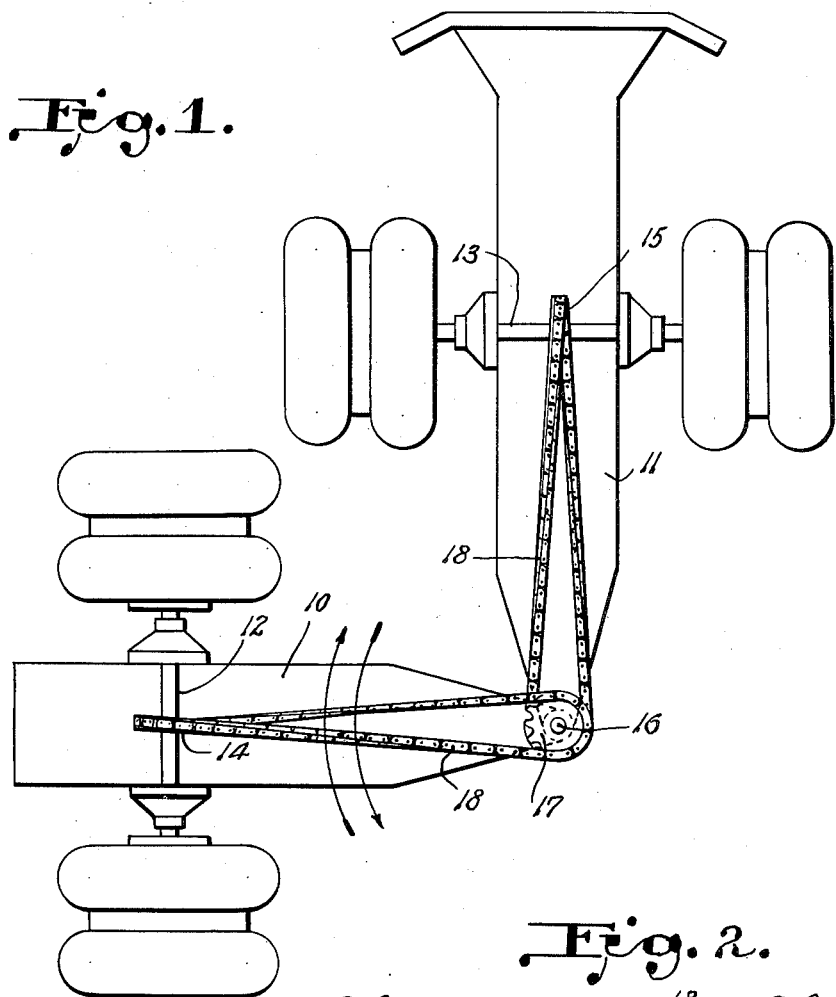
Fig. 1.
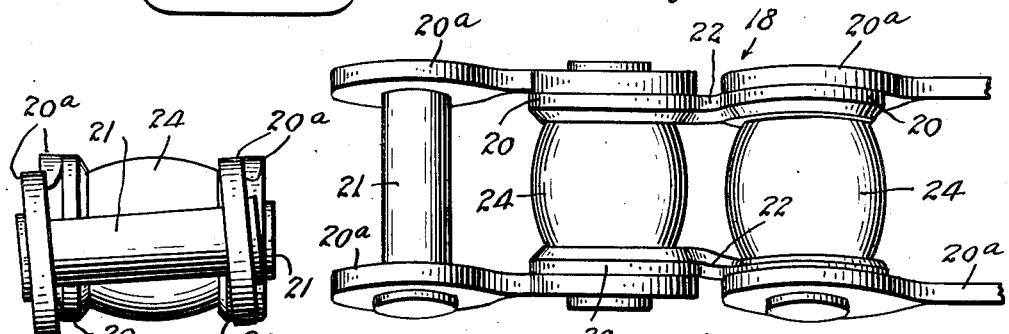
Fig. 2.
Fig. 3.
Emmitt M. Tucker
INVENTOR
BY Snow & Co.
ATTORNEYS.

July 1, 1958 E. M. TUCKER 2,841,022
TWISTED CHAIN DRIVE
Filed Feb. 10, 1955 2 Sheets-Sheet 2

Emmitt M. Tucker
INVENTOR

BY C. A. Snowles.
ATTORNEYS.

United States Patent Office 2,841,022
Patented July 1, 1958

2,841,022

TWISTED CHAIN DRIVE

Emmitt Marcus Tucker, Medford, Oreg.

Application February 10, 1955, Serial No. 487,368

4 Claims. (Cl. 74—245)

This invention relates to mechanical movements and has special reference to a chain and sprocket drive for shafts in angularly disposed relation and wherein the chain and sprockets are disposed in different planes.

More particularly, the invention is a continuation-in-part of my prior application, Short Turn Tractor With Twisted Four-Wheel Chain Drive, Serial No. 414,618, filed March 8, 1954 now abandoned. In my prior application there was disclosed a chain and sprocket drive wherein two shafts were shown with their axes at right angles, in combination with a vehicle and a claim was made for this particular feature of the said prior application.

It is well known that two shafts in angular relation to each other may be provided with belt pulleys and connected by a belt running over these pulleys and having a twist in the space intermediate the two pulleys. However, to make this type of drive effective, the belt from one pulley must leave the pulley in such alignment with the periphery of the other pulley as to travel in a straight line, the return of the belt from the second pulley to the first being immaterial as to the relative positions of the pulley peripheries. In this type of transmission any attempt to drive the first mentioned pulley from the second pulley for the purpose of reversing the drive will fail because the longitudinal stress will occur on that part of the belt normally somewhat slack between the two pulleys and the result will be that the belt will be pulled off of the first pulley because it will engage the periphery of the first pulley at an angle.

It is true that in order to prevent this pulling off effect, idler pulleys have been employed but this tends to complicate the entire device.

Heretofore it has been impossible to obtain a positive chain and sprocket drive between two shafts angularly disposed, and in different planes in which the direction of the drive is reversible and in which it is not necessary to employ any idler or guide means.

The principal object of the present invention is to provide a chain and sprocket drive between two shafts angularly disposed relative to each other in different planes and in which, without any guide members or the like a twisted chain will automatically properly engage the sprockets, no matter in which direction the drive is operated.

A further important object of the invention is to provide a novel form of sprocket tooth which will aid in guiding a chain into proper driving relation in a plane perpendicular to the axis of the sprocket.

Still another important object of the invention is to provide a sprocket chain equipped with elements cooperating with the particular teeth of the sprockets used to center the driving action of the chain on the median plane of the driven sprocket.

Another important object of the invention is to provide a combination of sprocket of special construction and a chain cooperating therewith, in which the chain will be automatically caused to properly align with the driven sprocket.

A still further object of the invention resides in the provision of a chain of this character wherein the side plates of each link are slightly canted at a point intermediate the pins in such manner that each pin is canted at a relatively slight angle relative to each adjacent pin, the cant of successive pins being of the same degree and in the same direction.

Still another object of the invention resides in the provision of a chain having the afore mentioned canted side links employing pin rollers of barrel shape, or oval in longitudinal cross section to provide a central convexity for use in a combination with a sprocket having correspondingly concaved tooth surfaces extending from the root to the points of the teeth.

A further object of the invention resides in the provision of a bevel on the inner sides of the chain links to improve engagement with the sprockets.

Still another object resides in the tapering of the sprocket teeth from the pitch diameter to the outside diameter to provide a tooth of substantially trapezoidal cross section.

Still another object of the invention is the provision of a chain assembly for the chain drive of sprockets positioned angularly relative to each other, which is sturdy and durable in construction, reliable and efficient in operation, and relatively simple and inexpensive to manufacture, assemble and utilize.

Still other objects reside in the combinations of elements, arrangements of parts, and features of construction, all as will be more fully pointed out hereinafter, and disclosed in the accompanying drawings wherein there is shown a preferred embodiment of one form of this inventive concept.

In the drawings:

Figure 1 is an outline plan view of a vehicle embodying a chain assembly in accordance with the instant invention, disclosing the means of employing such chains in pairs to change vertical sprocket movement to horizontal sprocket movement, and thence back to vertical sprocket movement, whereby to facilitate the turning of a sectional device.

Figure 2 is an enlarged fragmentary sectional view of a portion of a chain constructed in accordance with the instant invention, certain parts thereof being omitted.

Figure 3 is an end elevational view of the construction of Figure 2, disclosing an important feature of construction.

Similar reference characters refer to similar parts throughout the several views of the drawing.

Figure 5:
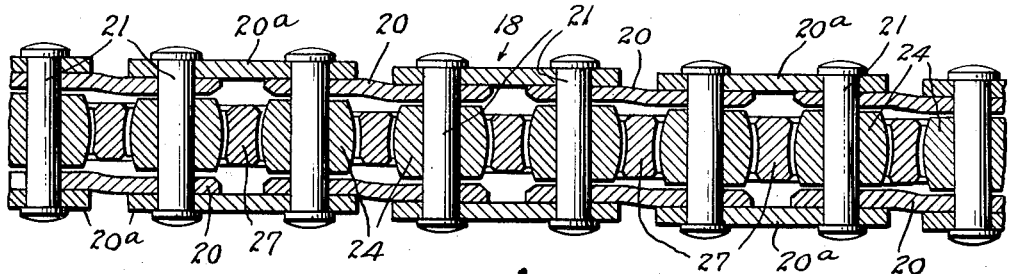
Figure 5 is an enlarged fragmentary sectional view taken substantially along the line 5—5 of Figure 4.
Figure 6:
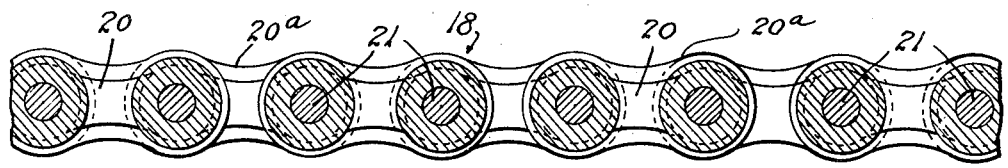
Figure 6 is an enlarged longitudinal sectional view taken substantially along the center line of a fragment of chain.

Having reference now to the drawings in detail, and more particularly to Figure 1, there are disclosed at 10 and 11 respectively, a pair of pivotally connected vehicle sections, such as the portions of a tractor and trailer, which sections are provided respectively with horizontally extending shafts 12 and 13, each of which has positioned thereon a sprocket gear 14 and 15 respectively, the gears to be more fully described hereinafter. Positioned at the point of pivotal juncture of the sections 10 and 11 is a vertical shaft 16, provided with a pair of vertically spaced sprockets 17, mounted one above the other, the lowermost being not shown.

The uppermost of sprockets 17 is connected to sprocket 14 as by means of a chain 18, of a type to be more fully described hereinafter, while a second chain 18 substantially identical to the first mentioned chain is secured to the lowermost of the sprockets 17, and extends about the sprocket 15. It will thus be noted that the transmission of vertical rotation of sprocket 14 is transmitted through chain 18 and horizontal sprocket 17 to vertical sprocket 15, without interfering with the pivotal action of the sections 10 and 11, all as more fully pointed out in my previously mentioned application Serial No. 414,618.

Having reference now particularly to Figures 2 and 3 it will be seen that each chain 18 is comprised of a plurality of substantially identical links, comprised of oppositely disposed link side plates 20, extending between the ends of which are a plurality of link pins 21. Each of side plates 20 is provided with a relatively slight twist or cant, as indicated at 22, in such manner that each link pin 21 is offset at a relatively slight angle relative to the next succeeing link pin. Each link is thus offset in the same direction and to the same degree, the arrangement being such that for a given length of chain, the pin 21 at one end of the chain is substantially at right angles to the pin at the other, so that when the opposite ends of the chain are connected to form an endless chain as for example at the repair link thereof, and the chain is looped, if the chain is suspended at one point, the bight of the loop thus formed will have the pin links extending in a direction substantially perpendicular to that of the uppermost link.

Each link pin 21 is adapted to be surrounded by a link roller 24, the latter being preferably of substantially barrel shape, or of ovaloid longitudinal cross section, as best seen in Figure 5. The link rollers 24 are adapted for coaction with a particular type of sprocket teeth to be more fully described hereinafter.

As is conventional in ordinary chains of this type, inner side link plates 20 alternate with outer side link plates 20a, and in this invention it has been found preferable that the inner link plates 20 be beveled along their longitudinal edges to facilitate the engagement of the link rollers with the sprocket teeth.

Figure 4:
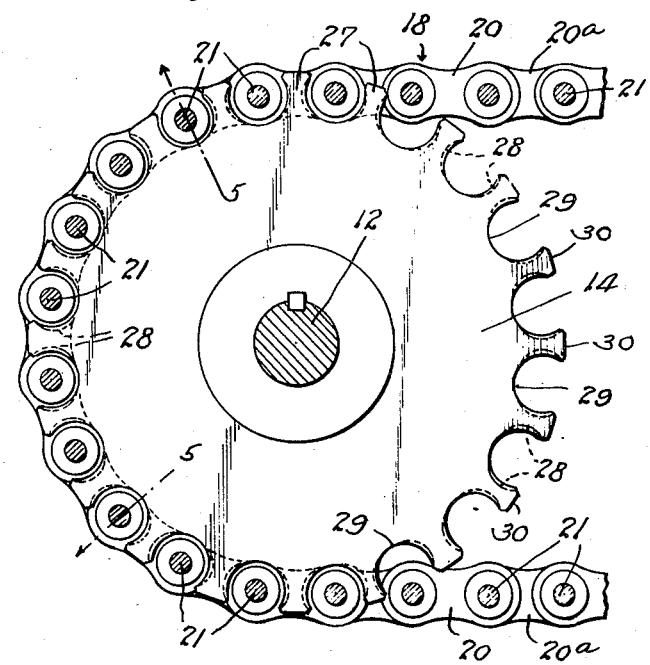
Figure 4 is an enlarged side elevational view of a sprocket disclosing the chain in related assembly therewith, certain concealed portions thereof being indicated in dotted lines.
Figure 7:
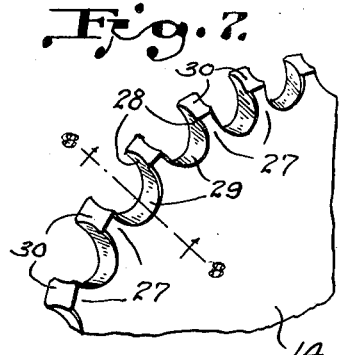
Figure 7 is a perspective view of one form of sprocket adapted for use in the instant invention.

Having reference now to Figures 4, 5, 7 and 8, there is disclosed in Figures 4 and 7 a sprocket 14, it being understood that the sprockets 14, 15 and 17 are all substantially identical in construction, allowing for suitable variations in size.

Figure 8:
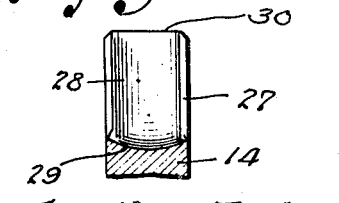
Figure 8 is an enlarged sectional view taken substantially along the line 8—8 of Figure 7.

The sprocket 14 is provided with a plurality of suitably spaced teeth 27, each of which is concaved along its face as best shown in Figure 5, the arc of curvature 28 corresponding to the radius of curvature of pin rollers 24, thus helping to center the pin links during their travel about the sprocket. As best shown in Figures 7 and 8, each of teeth 27 is tapered from the pitch line 29 to the point 30 thereof, so that in cross section in a radial direction each tooth assumes a relatively trapezoidal form, to further facilitate the coaction of the chain and its associated pin rollers with its associated sprocket. By virtue of this arrangement it will be apparent that a chain drive between a pair of shafts positioned at right angles or less relative to each other may be readily effected, regardless of the direction of drive, since the tension and angular relationship of associated links and link pins as well as their relationship with the uniquely constructed sprocket teeth is identical, regardless of the direction in which the chain is moving. The concavity of the teeth, in coaction with the convexity of the pin rollers further serves to effect substantially automatic centering of the chain relative to its associated sprocket at all times.

From the foregoing it will now be seen that there is herein provided an improved chain and sprocket drive for shafts positioned in angular relation to each other, which accomplishes all of the objects of this invention, and others, including many advantages of great practical utility and commercial importance.

As many embodiments may be made of this inventive concept, and as many modifications may be made in the embodiment hereinbefore shown and described, it is to be understood that all matter herein is to be interpreted merely as illustrative and not in a limiting sense.

What is claimed is:

1. In a chain for power transmission between shafts angularly disposed relative to each other, in different planes, a plurality of links, each link comprising a pair of spaced side plates and a roller pin at each end thereof, each of said side plates being twisted so that the opposite ends thereof lie in planes angularly disposed relative to each other in relation to the longitudinal axis of each plate, said longitudinal axis lying in a straight line, to provide an angular displacement between the pins at opposite ends of each link.

2. In a chain for power transmission between shafts angularly disposed relative to each other, in different planes, a plurality of links, each link comprising a pair of spaced side plates and a roller pin at each end thereof, each of said side plates being twisted so that the opposite ends thereof lie in planes angularly disposed relative to each other in relation to the longitudinal axis of each plate, said longitudinal axis lying in a straight line, to provide an angular displacement between the pins at opposite ends of each link, successive links being similarly formed to effect a similar displacement between the last pin in one link and the first pin in the next.

3. In a chain for power transmission between shafts angularly disposed relative to each other, in different planes, a plurality of links, each link comprising a pair of spaced side plates, and a roller pin at each end thereof, each of said side plates being twisted so that the opposite ends thereof lie in planes angularly disposed relative to each other in relation to the longitudinal axis of each plate, said longitudinal axis lying in a straight line, to provide an angular displacement between the pins at opposite ends of each link, successive links being similarly formed to effect a similar displacement between the last pin in one link and the first pin in the next, and barrel shaped rollers on said roller pins.

4. In a chain for power transmission between shafts angularly disposed relative to each other, in different planes, a plurality of links, each link comprising a pair of spaced side plates and a roller pin at each end thereof, each of said side plates being twisted so that the opposite ends thereof lie in planes angularly disposed relative to each other in relation to the longitudinal axis of each plate, said longitudinal axis lying in a straight line, to provide an angular displacement between the pins at opposite ends of each link, successive links being similarly formed to effect a similar displacement between the last pin in one link and the first pin in the next, and barrel shaped rollers on said roller pins, said side plates being bevelled inwardly along their longitudinal edges to facilitate engagement of the pin rollers with the teeth of a sprocket.

References Cited in the file of this patent

UNITED STATES PATENTS

| | | |
|---|---|---|
| 542,686 | Ribyn | July 16, 1895 |
| 554,272 | Hockhaus | Feb. 11, 1896 |
| 564,830 | Monks | July 28, 1896 |
| 2,277,915 | Klaucke | Mar. 31, 1942 |
| 2,458,682 | Couper | Jan. 11, 1949 |
| 2,652,143 | Van Doren | Sept. 15, 1953 |

FOREIGN PATENTS

| | | |
|---|---|---|
| 858,686 | France | May 20, 1940 |
| 261,030 | Switzerland | Aug. 1, 1949 |